(12) United States Patent
Haltiner, Jr.

(10) Patent No.: US 6,759,155 B2
(45) Date of Patent: Jul. 6, 2004

(54) PLATE CONSTRUCTION OF HIGH TEMPERATURE AIR-TO-AIR HEAT EXCHANGER

(75) Inventor: Karl J. Haltiner, Jr., Fairport, NY (US)

(73) Assignee: Delphi Technologies, Inc., Troy, MI (US)

( * ) Notice: Subject to any disclaimer, the term of this patent is extended or adjusted under 35 U.S.C. 154(b) by 448 days.

(21) Appl. No.: 09/838,677

(22) Filed: Apr. 19, 2001

(65) Prior Publication Data

US 2003/0031904 A1 Feb. 13, 2003

Related U.S. Application Data

(60) Provisional application No. 60/200,932, filed on May 1, 2000.

(51) Int. Cl.[7] .................................................. H01M 8/04
(52) U.S. Cl. .............................. 429/17; 429/13; 429/14
(58) Field of Search ............................ 429/17, 13, 14, 429/26, 32, 34–39

(56) References Cited

U.S. PATENT DOCUMENTS

| | | | |
|---|---|---|---|
| 5,922,485 A | * 7/1999 | Enami | 429/26 |
| 6,051,331 A | * 4/2000 | Spear et al. | 429/34 |
| 6,132,895 A | * 10/2000 | Pratt et al. | 429/39 |
| 6,230,494 B1 | 5/2001 | Botti et al. | |
| 6,322,919 B1 | * 11/2001 | Yang et al. | 429/34 |
| 6,329,090 B1 | * 12/2001 | McElroy et al. | 429/13 |
| 6,423,896 B1 | 7/2002 | Keegan | |
| 6,461,754 B1 | * 10/2002 | Zeng | 429/26 |
| 6,485,852 B1 | 11/2002 | Miller et al. | |
| 6,500,574 B2 | 12/2002 | Keegan | |
| 6,509,113 B2 | 1/2003 | Keegan | |
| 6,551,734 B1 | 4/2003 | Simpkins et al. | |
| 6,562,496 B2 | 5/2003 | Faville et al. | |
| 6,608,463 B1 | 8/2003 | Kelly et al. | |
| 6,609,582 B1 | 8/2003 | Botti et al. | |
| 6,613,468 B2 | 9/2003 | Simpkins et al. | |
| 6,613,469 B2 | 9/2003 | Keegan | |
| 6,620,535 B2 | 9/2003 | Mukerjee et al. | |
| 2001/0055707 A1 | * 12/2001 | Roberts et al. | 429/30 |
| 2002/0110719 A1 | * 8/2002 | Pien et al. | 429/35 |
| 2002/0119360 A1 | * 8/2002 | Dong et al. | 429/34 |

\* cited by examiner

Primary Examiner—Bruce F. Bell
Assistant Examiner—Monique Wills
(74) Attorney, Agent, or Firm—Paul L. Marshall

(57) ABSTRACT

A fuel cell system including a fuel cell stack, a reformer system, and a waste energy recovery (or heat exchanger) assembly is presented. The waste energy recovery assembly receives an anode supply and a cathode supply that are heated by exhaust gases from the fuel cell stack. The heated anode supply and cathode supply are then directed to the fuel cell stack. The waste energy recovery assembly includes a series of stacked plates. The flow direction of the plates alternates from one plate to the next. These plates are alternately stacked until the desired flow area and heat transfer are achieved. Since the direction of flow of each plate is perpendicular to the direction of flow of the next plate in series, the cool (anode and cathode) gases flow along side a plate experiencing a flow of heated exhaust gases and are thusly heated.

18 Claims, 2 Drawing Sheets

PLATE CONSTRUCTION OF HIGH TEMPERATURE AIR-TO-AIR HEAT EXCHANGER

CROSS-REFERENCE TO RELATED APPLICATION

The present application claims the benefit of the filing date of U.S. Provisional Application Ser. No. 60/200,932, Attorney Docket No. DEP-0183P, filed on May 1, 2000.

BACKGROUND OF THE INVENTION

A fuel cell is an energy conversion device that converts chemical energy into electrical energy. The fuel cell generates electricity and heat by electrochemically combining a gaseous fuel, such as hydrogen, carbon monoxide, or a hydrocarbon, and an oxidant, such as air or oxygen, across an ion-conducting electrolyte. The fuel cell generally consists of two electrodes positioned on opposite sides of an electrolyte. The oxidant passes over the oxygen electrode (cathode) while the fuel passes over the fuel electrode (anode), generating electricity, water, and heat.

A solid oxide fuel cell (SOFC) is constructed entirely of solid-state materials, utilizing an ion conductive oxide ceramic as the electrolyte. The electrochemical cell in a SOFC comprises an anode and a cathode with an electrolyte disposed therebetween.

In a SOFC, a fuel flows to the anode where it is oxidized by oxygen ions from the electrolyte, producing electrons that are released to the external circuit, and mostly water and carbon dioxide are removed in the fuel flow stream. At the cathode, the oxidant accepts electrons from the external circuit to form oxygen ions. The oxygen ions migrate across the electrolyte to the anode. The flow of electrons through the external circuit provides for consumable or storable electricity. However, each individual electrochemical cell generates a relatively small voltage. Higher voltages are attained by electrically connecting a plurality of electrochemical cells in series to form a stack.

In operation, a SOFC system generates electricity and heat by this electrochemical process of combining a fuel and an oxidant. The fuel (i.e., reformate) provided to the SOFC is produced in a reformer. Byproducts from the SOFC, a supply of oxidant, and a supply of reformate can be directed through a waste energy recovery unit. The waste energy recovery unit is a device that converts chemical energy and thermal energy into input thermal energy for the SOFC system. This is accomplished with heat exchangers. Unlike a SOFC, the waste energy recovery unit is comprised of durable and heat transferable materials. These waste energy recovery units have many tubes and connections for directing the chemical and thermal energy through the large unit.

SUMMARY OF THE INVENTION

The above-discussed and other drawbacks and deficiencies of the prior art are overcome or alleviated by a fuel cell system including a fuel cell stack, a reformer system, and a waste energy recovery (or heat exchanger) assembly is presented. The waste energy recovery assembly receives an anode supply and a cathode supply that are heated by exhaust gases from the fuel cell stack. The heated anode supply and cathode supply are then directed to the fuel cell stack. The waste energy recovery assembly includes a series of stacked plates. The plates have openings or manifold passages for flow of the anode supply, the cathode supply, and the cell stack exhaust. The plates also have etchings that define flow channels for the anode supply, the cathode supply, and the cell stack exhaust across the plates. The flow direction of the plates alternates from one plate to the next. These plates are alternately stacked until the desired flow area and heat transfer are achieved. The total number of plates forming a waste energy recovery assembly can range from two to several hundred, depending on space and weight restrictions, and the like. Since the direction of flow of each plate is perpendicular to the direction of flow of the next plate in series, the cool (anode and cathode) gases flow along side a plate experiencing a flow of heated exhaust gases and are thusly heated.

The above described and other features are exemplified by the following figures and detailed description.

BRIEF DESCRIPTION OF THE DRAWINGS

Referring now to the figures, wherein like elements are numbered alike.

DESCRIPTION OF THE PREFERRED EMBODIMENT

Although described in connection with a SOFC, it is to be understood that the plate construction of high temperature air-to-air heat exchanger can be employed with any type of fuel cell such as a SOFC, PEM, phosphoric acid, molten carbonate, and the like.

Figure 1:
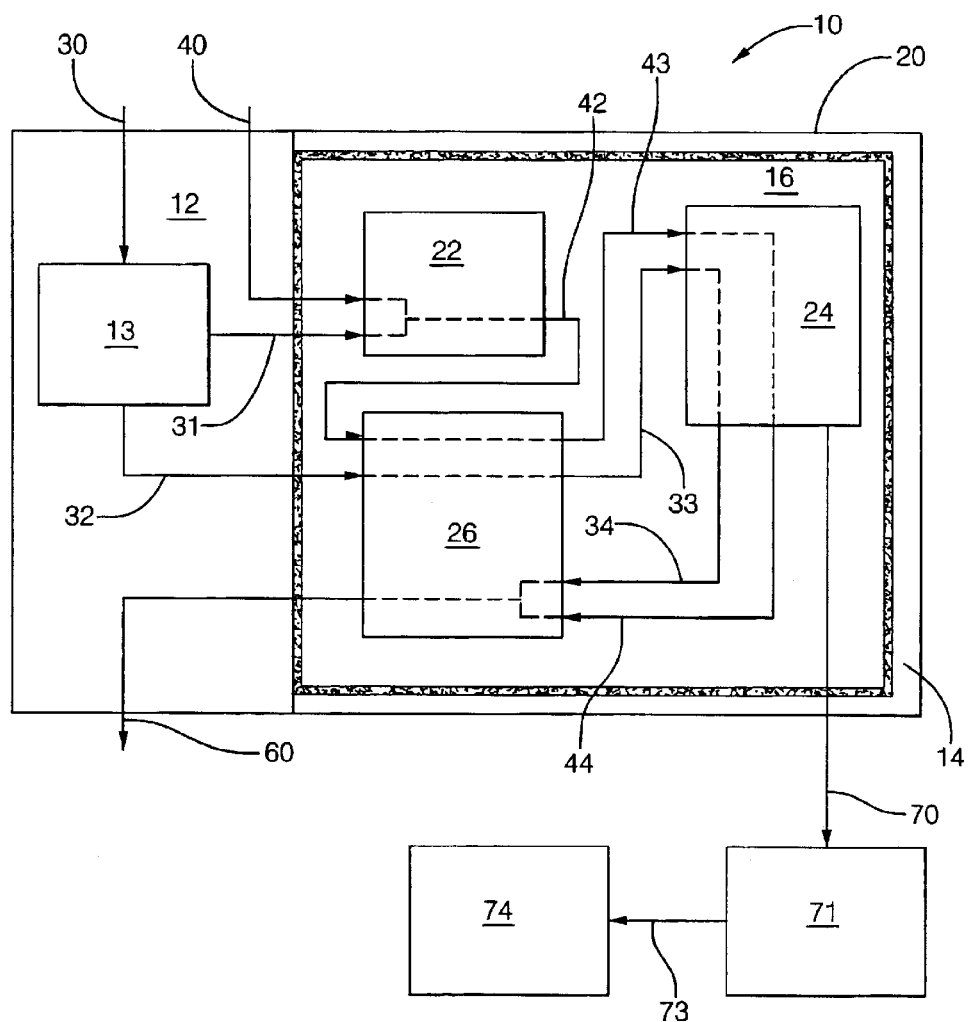
FIG. 1 is a schematic of a fuel cell system utilizing a waste energy recovery assembly.

Referring now to FIG. 1, a mechanization of a fuel cell system 10 is schematically depicted. A system enclosure 20 comprises a main plenum chamber 12, an insulation plenum chamber 14, and a hot box chamber 16. The hot box chamber 16 includes a fuel cell stack 24, a reformer system 22, and a waste energy recovery (or heat exchanger) assembly 26. A supply of air 30, exterior to the system enclosure 20, provides air to a process air supply section 13 located within the main plenum chamber 12. The process air supply section 13 can be a main blower (not shown) and air control valves (not shown), as is known. A supply of fuel 40, exterior to the system enclosure 20, provides fuel to the fuel cell system 10. The fuel can be provided via fuel injectors (not shown) located within the main plenum chamber 12, as is known. The supply of fuel 40 and a flow of air 31 are directed to the reformer system 22. Distribution of a reformate 42 from the reformer system 22 can be accomplished with a reformate control valve (not shown) controlled by an electrical actuator (not shown), as is known. The supply (or stream) of reformate 42 created in the reformer system 22 is directed to the waste energy recovery assembly 26.

The waste energy recovery assembly 26 receives an anode supply (i.e., reformate) 42 and a cathode supply (e.g., oxidant air or the like) 32 that are heated in the waste energy recovery assembly 26. The heated anode supply 43 and cathode supply 33 are then directed to the fuel cell stack 24. To aid in heating the anode supply 42 and cathode supply 32, the waste energy recovery assembly 26 recovers the heated anode exhaust 34 and cathode exhaust 44 from the fuel cell stack 24. A flow of reaction byproducts (e.g., water, carbon dioxide, and the like) 60 is discharged from the waste energy recovery system 26 to the exterior environment.

The fuel cell stack 24, in this exemplary embodiment, is a solid oxide fuel cell (SOFC) having a multilayer ceramic/ metal composite structure designed to produce an electrical output 70 at an operating temperature of about 800° C. to about 1,000° C. The fuel cell stack 24 comprises one or more multi-cell modules that are mounted to a common gas distribution manifold. Each module of the fuel cell stack 24 produces a specific voltage that is a function of the number of cells in the module. Electrical attachment of the fuel cell stack 24 is accomplished by way of electrodes at the base and top of each module that lead out of the hot box 16 and system enclosure 20 to a vehicle power bus and system (not shown). The output voltage and current is controlled by the combination of these modules in series and parallel electrical connections, the air/fuel control system, and the electric load applied to the fuel cell system 10.

The electrical signal 70 is presented to power electronics system 71 (which includes system controllers and a battery, e.g., LiPo battery or the like) of a vehicle (not shown). This processed electric signal is then presented by a signal line 73 to electrical loads 74 of the vehicle.

To facilitate the reaction in the fuel cell, a direct supply of fuel, such as hydrogen, carbon monoxide, or methane, is preferred. However, concentrated supplies of these fuels are generally expensive and difficult to supply. Therefore, the specific fuel can be supplied by processing a more complex source of the fuel. The fuel utilized in the system is typically chosen based upon the application, expense, availability, and environmental issues relating to the fuel. Suitable fuels include fuels such as hydrocarbon fuels, which includes, but are not limited to, liquid fuels, such as gasoline, diesel, ethanol, methanol, kerosene, and others; gaseous fuels, such as natural gas, propane, butane, and others; alternative fuels, such as hydrogen, biofuels, dimethyl ether, and others; and synthetic fuels, such as synthetic fuels produced from methane, methanol, coal gasification or natural gas conversion to liquids, and others; and combinations comprising at least one of the forgoing fuels. The preferred fuel is typically based upon the power density of an engine, with lighter fuels (i.e., those which can be more readily vaporized and/or conventional fuels which are readily available to consumers) generally preferred.

The processing (or reforming) of hydrocarbon fuels, such as gasoline, is completed to provide an immediate fuel source for rapid start up of the solid oxide fuel cell, as well as protecting the solid oxide fuel cell by removing impurities. Fuel reforming in the reformer system 22 (which preferably includes a main reformer and a micro-reformer) is used to convert a hydrocarbon (such as gasoline) or an oxygenated fuel (such as methanol) into the reformate (e.g., hydrogen and carbon monoxide) and byproducts (e.g., carbon dioxide and water). Common approaches include steam reforming, partial oxidation, dry reforming, and the like, as well as combinations comprising at least one of the foregoing approaches, all of which are known.

The waste energy recovery assembly 26 is located within the hot box chamber 16 and serves to convert the unused chemical energy (reformate) and thermal energy (exothermic reaction heat from the fuel cell stack 24) to input thermal energy for the fuel cell system 10 through the use of an integration of catalytic combustion zones and heat exchangers. Air is supplied to the waste energy recovery assembly 26 from the process air supply section 13 in the main plenum 12. The waste energy recovery assembly 26 receives fuel from two sources during operation. During the early part of start-up, low-grade reformate from the reformer system 22 is routed, with a supply of air, directly to the waste energy recovery assembly 26 catalytic combustor. During normal operation, reformate is directed through the waste energy recovery assembly 26 heat exchangers to the fuel cell stack 24. The output of the fuel cell stack 24, anode exhaust 44 and cathode exhaust 34 is routed back to the waste energy recovery assembly 26 catalytic combustor to be mixed and catalyzed. The catalytic combustion zones heat the integrated heat exchangers of the waste energy recovery assembly 26.

Figure 2:
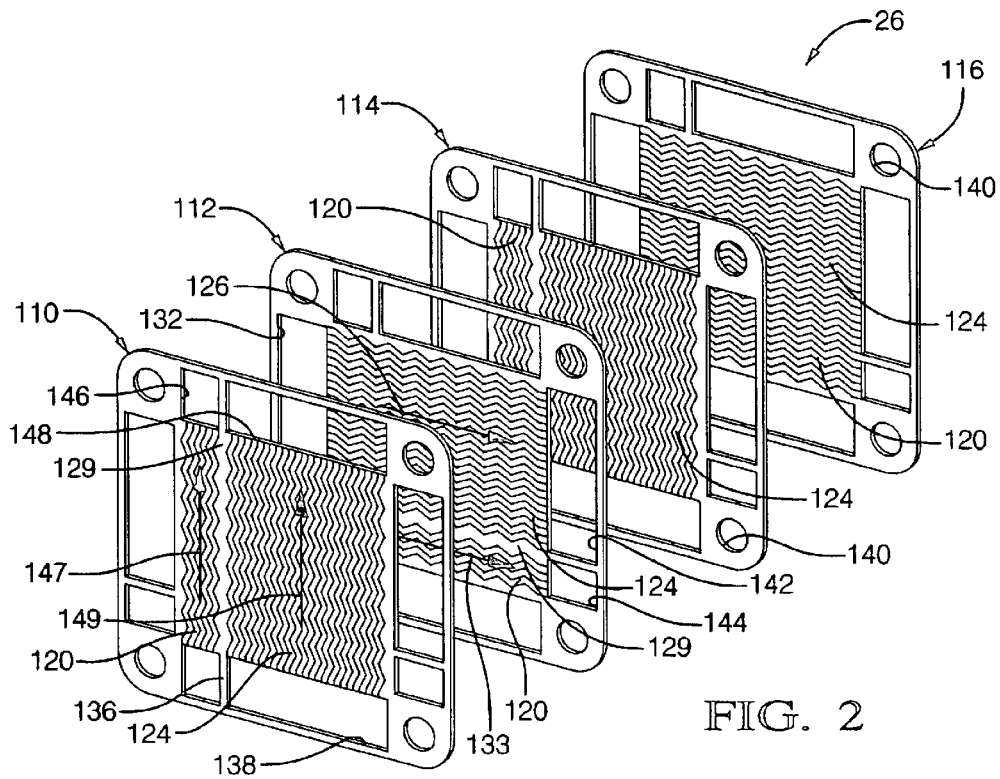
FIG. 2 is an expanded perspective view of individual plates of the waste energy recovery assembly.
Figure 3:
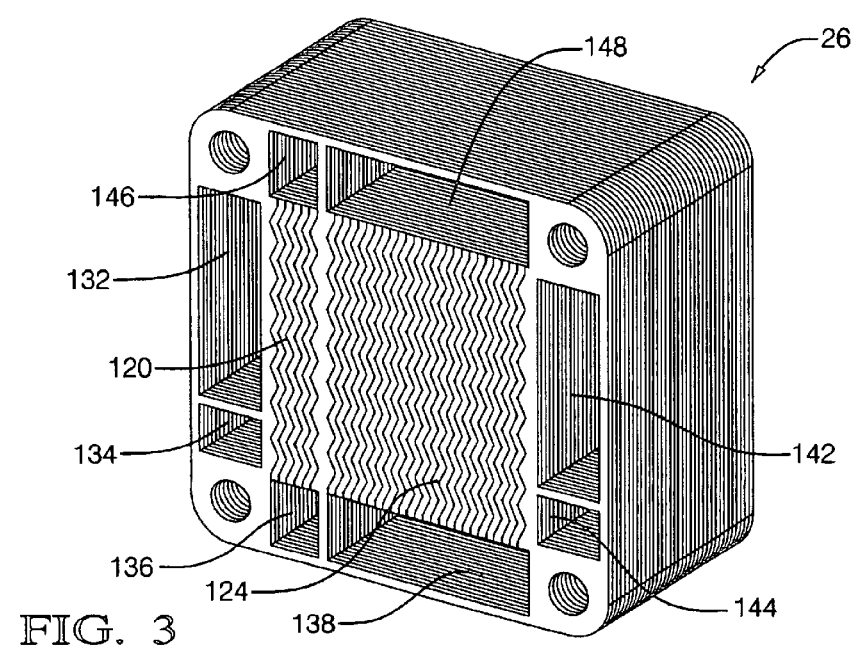
FIG. 3 is a perspective view of the individual plates of FIG. 2.

Referring to FIGS. 2 and 3, the waste energy recovery assembly 26 includes a series of connected (stacked) flat plate structures 110, 112, 114, 116. The plates 110, 112, 114, 116 each have a plurality of openings therein for facilitating the flow of oxidant, reformate, or exhaust gases through the waste energy recovery assembly 26, as is described in more detail below. The plates 110, 112, 114, 116 also have etchings, chevrons, channels, or serpentines patterns 120, 124 at one or both surfaces thereof. These etchings define flow channels for the oxidant, reformate, or exhaust across the plates. Such patterns induce a swirl into the gas flow that improves heat transfer and enhances exposure of gas molecules to a catalyst (described below). The oxidant (a cool gas) enters from an inlet passage (i.e., the cathode gas supply manifold inlet) 132 through the etchings 124 to an outlet passage (i.e., the cathode gas supply manifold outlet) 142, with the direction of the flow of the oxidant being across the plates, as illustrated by flow arrow 126. The reformate, (a cool gas) enters from an inlet passage (i.e., the anode gas supply manifold inlet) 134 through the etchings 120 to an outlet passage (i.e., the anode gas supply manifold outlet) 144, with the direction of the flow of the reformate exhaust being across the plates, as illustrated by a flow arrow 133. The exhaust (a hot gas) enters from inlet passages (i.e., the stack exhaust inlet) 136, 138 through the etchings 120 and 124 to outlet passages (i.e., the stack exhaust outlet) 146, 148 with the direction of the flow of the exhaust being across the plates, as illustrated by flow arrows 147 and 149.

A rib, divider, or stiffener 129 extends across each plate. The rib 129 separates the anode and cathode gases flowing across a plate. The rib 129 is formed in each plate during the manufacture of the plate. In the case of the anode and cathode passages, the rib 129 creates two parallel, sealed passages that prevent the mixing of the anode gases with the cathode gases. The rib 129 divides the two passages such that there is sufficient volume in each passage to enable the desired flow to the fuel cell stack 24 e.g., the anode passages can be about one-third the size of the entire passage opening (i.e., the anode passage and the cathode passage combined). In the case of the exhaust passages, the rib 129 creates two parallel, sealed passages. The rib 129, while splitting the exhaust gas exist as a cost savings measure whereby the same type plate can be used for the anode/cathode gases as is used for the exhaust gas. In other words, each of the plates are preferably the same, they are only orientated differently. However, the hot gas plates and cool gas plates could be different parts with different internal features, if desired.

The plates 110, 112, 114, 116 are preferably fabricated from sheet metal. The plates preferably comprise a material that is able to withstand the operating temperatures of a fuel cell system, while also being a good conductor of heat. Suitable materials include ferritic stainless steels, nickel, aluminum, silver, copper, ferrous materials, strontium, lanthanum, chromium, chrome, gold, platinum, palladium, titanium, and the like, as well as alloys, oxides, and combinations comprising at least one of the foregoing materials. The thickness of the flat plate structures is selected to provide the desired heat transfer and will vary depending upon the material selected.

The etchings 120, 124 are etched, stamped, embossed, molded, or carved into the center portion of the plate by, for example, a photochemical machining process, or the like. The etchings 120, 124 preferably have a uniform depth sufficient to allow for the effective flow of gases. The etchings 120, 124, which can form a single passage across the plate or multiple passages, are preferably disposed in parallel and have a depth sufficient to enable the flow of gas across the plate without adversely affecting the structural integrity of the plate and with minimal gas pressure loss.

The geometry of the etchings is dependent upon plate structural integrity, the ability to inhibit mixing between the gases, the thermal transfer characteristics of the geometry, including the percentage of the plate surface employed to enable the thermal transfer, and as with the depth, is dependent upon the flowability of gases. The geometry may comprise a pattern that induces a swirl into the flow of the gases, which may improve the transfer of heat. Possible etching geometries include straight "S" shaped, serpentine, a wave-form (e.g., a rounded wave, a more pointed wave, a multi-sided wave, or the like), and the like. The etchings 120, 124 are preferably formed into one side of the plate, while the other side is flat and unetched. The plates each comprise of a first plate having the etchings (on one side) that is joined with a second plate having a flat side (i.e., flat on one side and etchings preferably perpendicular to the first plate's etchings on the other side) such that the etching is a closed channel for the flow of gases.

The plates are attached (preferably brazed) together in the waste energy recovery assembly 26 with the etchings of one plate being perpendicular to etchings of the other plate, and continued as such, preferably, in series. The etchings of one plate abut the flat (or unetched) side of the other adjacent plate. The brazing of the plates can be completed by applying a braze paste comprising a noble metal, such as nickel, platinum, palladium, gold, and the like; as well as alloys, to the individual plates and placing the components in a furnace (e.g., a hydrogen bright anneal furnace). Other means of applying the braze medium may be used, such as powder, foil, or pre-plating or cladding the braze material to the plate.

After the brazing of the plates, the passages that will be disposed in contact with the exhaust gases from the fuel cell stack are coated with a catalyst material. The catalyst material is disposed onto the selected plates by any method that will form a catalytic coating on the plate having sufficient structural integrity, such as a wash coat process. The catalyst material may comprise zirconium, nickel, platinum, rhodium, palladium, osmium, iridium, ruthenium, aluminum, titanium, chromium, and the like, as well as oxides, alloys, and combinations of at least one of the foregoing materials.

The plate 110 having the flow channels (as defined by the etchings 120) in one direction is brazed to the plate 112 having the flow channels (as defined by the etchings 124) in another direction perpendicular that of the flow channels of the plate 110. This alternating of flow directions allows for the cooling and heating of the gases as the gases flow through the waste energy recovery assembly 26. During operation heated exhaust gases from the fuel cell stack 24 flow across the plates 110 and 114 and cool gas (anode and cathode gases) flow across the plates 112 and 116. The etchings, in the stacked plates, seal against the flat bottom surface of an adjacent or previously stacked plate, with the direction of the etchings preferably being perpendicular to each other in an alternating fashion, as is shown in FIG. 2. Preferably, the flow direction of the plate 114 is the same as the flow direction of the plate 110 and the flow direction of the plate 116 is the same as the flow direction of the plate 112. These plates are alternately stacked until the desired flow area and heat transfer are achieved. The total number of plates forming a waste energy recovery assembly 26 can range from two to several hundred, depending on space and weight restrictions, and the like. Since the etchings of each plate are perpendicular to the etchings of the next plate in series, the cool gases flow along side a plate experiencing a flow of heated exhaust gases and are heated.

Apertures 140 are provided for retaining the plates, with the plates being supported in an arrangement (e.g., housing) that would facilitate proper flow through the plates, as described herein. For example, the anode gas supply manifold inlet, the cathode gas supply manifold inlet, and the stack exhaust manifold inlet will all be open at a first end of the waste energy recovery assembly and closed off at the second end thereof, while the anode gas supply manifold outlet, the cathode gas supply manifold outlet, and the stack exhaust manifold outlet will all be open at the second end of the waste energy recovery assembly and closed off at the first end thereof. Many inlet and outlet combinations are possible.

In operation, at least a portion of the reformate (i.e., anode gases) from a reformer and an oxidant (i.e., a cathode gas) are directed through the waste energy recovery assembly in route to the fuel cell stack. The reformate and oxidant are heated while passing through the passages and etchings of the waste energy recovery assembly. The heated reformate and oxidant are then directed to the fuel cell. At the same time, exhaust from the fuel cell stack is directed to the waste energy recovery assembly. The exhaust from the fuel cell is heated and can comprise reformate, oxidant, and/or byproducts of the reaction within the fuel cell stack. Within the waste energy recovery assembly, the reformate is burned with air and any remaining byproducts using the combustor. In turn, the thermal energy created by the burning of the exhaust heats the reformate and oxidant en route to the fuel cell.

The waste energy recovery assembly is easier to manufacture and assemble than conventional waste energy recovery assemblies because of the durable design of the plates. The use of the alternating plates provides for a large surface area for the transfer of thermal energy. The design of the waste energy recovery assembly provides for fewer parts, tubes and connections without experiencing significant pressure drops in the gas streams. The etchings allow for the movement of the gases, without excessive turbulence, resulting in a greater transfer of thermal energy.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A waste energy recovery assembly, comprising:
   a first plate having first flow channels defined at one side thereof, said first flow channels of said first plate being orientated in a first direction, said first plate having a first supply opening and a first exhaust opening therein, said first supply and first exhaust openings of said first plate positioned for communicating with said first flow channels of said first plate, said first flow channels configured to allow flow of both anode supply and cathode supply across said first plate to a fuel cell; and a second plate having second flow channels defined at one side of said second plate, said second flow channels of said second plate being orientated in a second direction different from said first direction, said second plate having a second supply opening and a second exhaust opening positioned for communicating with said second flow channels of said second plate, said second flow channels configured to allow flow of both anode exhaust and cathode exhaust across said second plate from said fuel cell, said second plate being disposed in thermal communication with said first plate heating said flow of both said anode supply and said cathode supply via said flow of both anode exhaust and cathode exhaust having a higher temperature.

2. The waste energy recovery assembly of claim 1 wherein said flow channels in each of said first plate and said second plate are defined by etchings in said first plate and etchings in said second plate.

3. The waste energy recovery assembly of claim 2 wherein said etchings are shaped to induce a swirl into a flow.

4. The waste energy recovery assembly of claim 2 wherein said etchings form a geometric pattern.

5. The waste energy recovery assembly of claim 4 wherein said geometric patterns include an S-shape pattern, a serpentine pattern, a chevron pattern, or a wave-form pattern.

6. The waste energy recovery assembly of claim 1 wherein said first direction is perpendicular to said second direction.

7. The waste energy recovery assembly of claim 1 wherein said first supply and first exhaust openings of said first plate are at least one of aligned with and in fluid communication with corresponding first supply and first exhaust openings disposed in said second plate, and said second supply and second exhaust openings of said second plate are at least one of aligned with and in fluid communication with corresponding second supply and second exhaust openings disposed in said first plate.

8. The waste energy recovery assembly of claim 7 wherein said first supply opening in each of said first plate and said second plate comprises an anode supply opening and a cathode supply opening.

9. The waste energy recovery assembly of claim 8 wherein:

said flow channels in said second plate includes anode exhaust flow channels and cathode exhaust flow channels;

said anode supply opening comprises an anode supply opening in and an anode supply opening out positioned for communication with said anode supply flow channels; and said cathode supply opening comprises a cathode supply opening in and a cathode supply opening out positioned for communication with said cathode supply flow channels.

10. The waste energy recovery assembly of claim 9 wherein said first plate further includes:

a rib separating said anode supply flow channels from said cathode supply flow channels.

11. The waste energy recovery assembly of claim 1 wherein said flow of anode supply is segregated from said flow of cathode supply across said first plate to a fuel cell via a first rib extending across said first plate in said first direction.

12. The waste energy recovery assembly of claim 1 wherein said flow of anode exhaust is segregated from said flow of cathode exhaust across said second plate from said fuel cell via a second rib extending across said second plate in said second direction.

13. The waste energy recovery assembly of claim 1 wherein said first direction is different than said second direction.

14. A method of waste energy recovery, comprising:

communicating an exhaust received at an exhaust opening in a first plate through exhaust flow channels defined at one side of said first plate to an exhaust opening out of said first plate, said exhaust flow channels being orientated in a first direction;

communicating an oxidant received at an anode supply opening in a second plate through anode supply flow channels defined at one side of said second plate to an anode supply opening out of said second plate, said anode supply flow channels being orientated in a second direction, said second plate being disposed in thermal communication with said first plate;

communicating a reformate received at a cathode supply opening in said second plate through cathode supply flow channels defined at said one side of said second plate to an anode supply opening out of said second plate, said cathode supply flow channels being orientated in said second direction; and whereby said oxidant and said reformate are heated.

15. The method of claim 14 wherein said exhaust flow channels are defined by etchings in said first plate, and said anode supply flow channels and said cathode supply flow channels are defined by etchings in said second plate.

16. The method of claim 14 wherein said first direction is different than said second direction.

17. The method of claim 14 wherein said first direction is perpendicular to said second direction.

18. The method of claim 15 further comprising:

inducing a swirl into at least one of said exhaust, said oxidant, or said reformate.

* * * * *